… …

United States Patent [19]

Hasegawa et al.

[11] Patent Number: 5,498,764
[45] Date of Patent: Mar. 12, 1996

[54] NEGATIVE ELECTRODE FOR LITHIUM SECONDARY CELLS AND LITHIUM SECONDARY CELLS USING THE SAME

[75] Inventors: Jun Hasegawa, Hekinan; Katsuhiko Suzuki, Aichi, both of Japan

[73] Assignee: Nippondenso Co., Ltd., Karita, Japan

[21] Appl. No.: 308,491

[22] Filed: Sep. 21, 1994

[30] Foreign Application Priority Data

Sep. 22, 1993 [JP] Japan .................. 5-236257

[51] Int. Cl.$^6$ ............... H01M 4/38; H01M 4/02; H01M 4/36
[52] U.S. Cl. ............... 429/218; 429/245
[58] Field of Search ............... 429/218, 245

[56] References Cited

U.S. PATENT DOCUMENTS

| | | | |
|---|---|---|---|
| 4,645,726 | 2/1987 | Hiratani et al. | 429/191 |
| 5,147,739 | 9/1992 | Beard | 429/194 |
| 5,162,178 | 11/1992 | Ohsawa et al. | 429/218 |
| 5,278,005 | 1/1994 | Yamauchi et al. | 429/194 |
| 5,283,136 | 2/1994 | Peled et al. | 429/192 |

FOREIGN PATENT DOCUMENTS

| | | |
|---|---|---|
| 2139860 | 5/1990 | Japan . |
| 2139861 | 5/1990 | Japan . |
| 684512 | 3/1994 | Japan . |

*Primary Examiner*—Prince Willis, Jr.
*Assistant Examiner*—Richard H. Lilley, Jr.
*Attorney, Agent, or Firm*—Cushman Darby & Cushman

[57] ABSTRACT

A negative electrode for lithium secondary cells comprises a substrate having a metallic lithium matrix on at least a surface portion thereof. An element is dispersed and doped in the lithium matrix and has an electronegativity greater than that of metallic lithium. The element is present in the matrix at a concentration of from less than $5\times10^{19}$ atoms/cm$^3$ to $5\times10^{15}$ atoms/cm$^3$. By this, dendrite crystals of lithium are suppressed from forming during the course of charge and discharge cycles. A lithium secondary cell using the negative electrode is also described.

18 Claims, 1 Drawing Sheet

U

14

NEGATIVE ELECTRODE FOR LITHIUM SECONDARY CELLS AND LITHIUM SECONDARY CELLS USING THE SAME

BACKGROUND OF THE INVENTION

1. Field of the Invention

This invention relates to lithium secondary cells and more particularly, to a negative electrode adapted for use in lithium secondary cells and capable of suppressing macrocrystals of dendrite from growing during the course of charge and discharge cycles of the cell.

2. Description of the Prior Art

Recently, attention has been paid to lithium metal, which has the lowest potential and has a maximum energy density per unit weight and unit volume, for use as an active substance of a negative electrode in high energy density-oriented secondary cells. For instance, Japanese Laid-open Patent Application No. 2-139860 sets out lithium secondary cells.

With lithium secondary cells using a lithium metal as the negative electrode, the charge and discharge life thereof will become shortened. This is because dendrite crystals of lithium are undesirably produced owing to the dissolution and precipitation of the lithium metal during the course of charge and discharge cycles of the cell, so that the charge and discharge efficiencies at the negative electrode lower. Moreover, the dendrite crystals which are grown up to large sizes may break through a separator, with the attendant problem that the negative electrode electrically contact with the positive electrode, resulting in short-circuiting.

SUMMARY OF THE INVENTION

It is accordingly an object of the invention to provide a negative electrode for lithium secondary cells which can overcome the above-stated problems of the prior art.

It is another object of the invention to provide a negative electrode for lithium secondary cells which can suppress growth of large-sized dendrite crystals thereby ensuring good charge and discharge efficiencies with a prolonged life of the cell.

It is a further object of the invention to provide a lithium secondary cell using a negative electrode of the type mentioned above.

The above objects can be achieved, according to the invention, by a negative electrode for lithium secondary cells which comprises a substrate having a metallic lithium matrix on at least a surface portion thereof, and an element which is dispersed and doped in the lithium matrix and which has an electronegativity greater than that of metallic lithium, the element being present in the matrix at a concentration of from less than $5\times10^{19}$ atoms/cm$^3$ to $5\times10^{15}$ atoms/cm$^3$.

Preferably, the substrate consists essentially of metallic lithium. The element having a greater electronegativity is preferably one which is an element of group Va of the periodic table. Most preferably, the element is phosphorus.

The invention is based on the finding that when lithium is crystallized on a lithium alloy obtained by doping phosphorus in a lithium matrix, dendrite crystals of lithium are unlikely to be formed when the concentration of phosphorus is within a predetermined range.

According to the invention, there is also provided a lithium secondary cell which comprises an electrode unit including a positive electrode, a negative electrode, and a separator provided between the positive and negative electrodes and impregnated with a liquid electrolyte containing a lithium-containing solute, the negative electrode comprising a substrate which has a metallic lithium matrix on at least a surface portion thereof, and an element which is dispersed and doped in the lithium matrix and which has an electronegativity greater than that of metallic lithium, the element being present in the matrix at a concentration of from less than $5\times10^{19}$ atoms/cm$^3$ to $5\times10^{15}$ atoms/cm$^3$.

DETAILED DESCRIPTION AND EMBODIMENTS OF THE INVENTION

Figure 1:
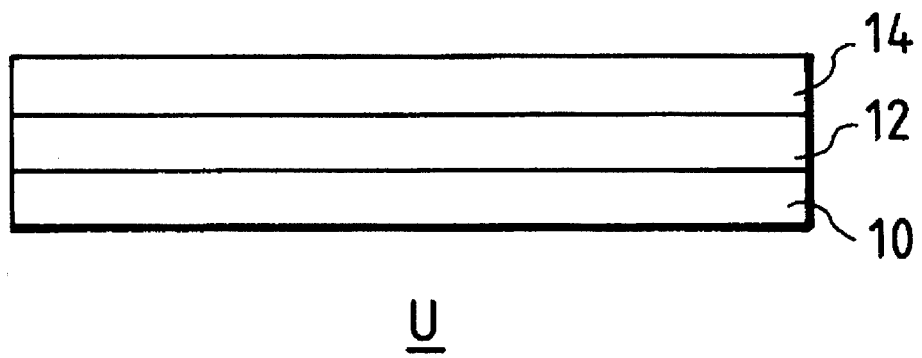
FIG. 1 is a schematic side view of an electrode unit of a lithium secondary cell comprising a negative electrode according to the invention.

Reference is now made to the accompanying drawings and particularly, to FIG. 1. FIG. 1 shows a typical electrode unit U of a lithium secondary cell. The unit U includes a positive electrode 10, a separator 12 and a negative electrode 14. The positive electrode 10 may be made of metal oxides capable of doping and de-doping lithium ions, such as LiMn$_2$O$_4$, ordinarily used for this purpose. The separator 12 may be made of porous polyolefin films, such as porous polypropylene films, and is impregnated with a liquid electrolyte. Typical examples of the electrolyte include LiClO$_4$, LiPF$_6$ and the like. These electrolytes are dissolved, for example, in solvents such as propylene carbonate, mixtures of propylene carbonate and dimethoxyethane, and the like at a concentration of 0.5 to 1.5 moles per liter of the solvent.

The positive electrode, separator and liquid electrolyte used in the lithium secondary cell of the invention are not specific but may, respectively, be those ordinarily used in the art. The electrode unit U may be encased in any appropriate casing (not shown) such as a metal casing by a usual manner.

Figure 2:
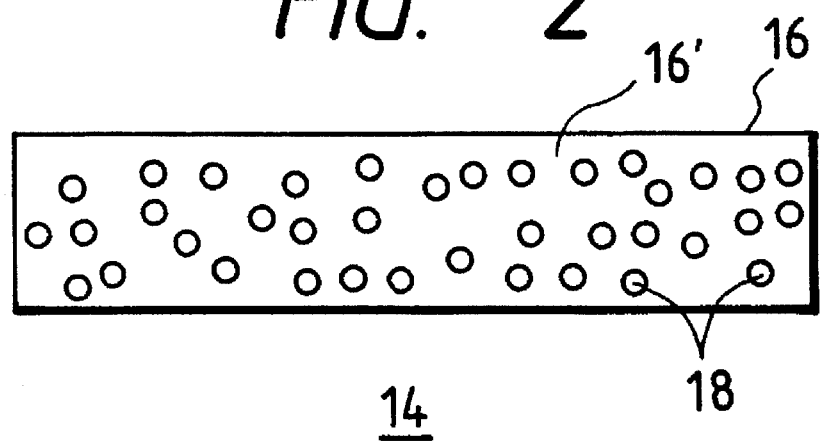
FIG. 2 is a schematic plan view of a negative electrode of the invention.

The invention is characterized by the negative electrode 14 as shown in FIG. 2. In the figure, the electrode 14 includes a substrate 16 having a metallic lithium matrix 16' on at least at a surface portion thereof and an element 18 which is dispersed in the metallic lithium matrix and which has an electronetativity greater than lithium. The element 18 is so dispersed in the lithium matrix that a multitude of grain boundaries between the lithium and the element, defects and/or ultrafine flexed sites are produced owing to the dispersion of the element 18. These grain boundaries, defects and/or ultra fine flexed sites are considered to serve as points or sites from which crystal nuclei are formed.

The substrate 16 of a lithium sheet or may be made of other conductive materials, such as Cu, in the form of a sheet. When the substrate is made of the other conductive materials, the surface portion of the substrate in which an element is dispersed or doped should be made of a lithium metal thin layer or matrix. Such a lithium thin layer may be formed by press bonding a lithium foil on the substrate.

The element dispersed or doped in the matrix is one which is of group Va of the periodic table. The elements of group Va have an electronegativity greater than lithium. Specific examples of the element include P, As and Sb. These elements may be used singly or in combination. Of these, P is preferred.

These elements should be present at a concentration from less than $5\times10^{19}$ atoms/cm$^3$ to $5\times10^{15}$ atoms/cm$^3$. The upper limit is preferably less than $5\times10^{18}$ atoms/cm$^3$, more preferably not larger than $1\times10^{18}$ atoms/cm$^3$. A higher concentration is more liable to form dendrite crystals of a large size. This has been experimentally confirmed.

For dispersing the element having a greater electronegativity in the lithium matrix, the element may be subjected to ion implantation wherein it is ionized and implanted into a substrate surface under appropriately controlled conditions sufficient to attain the above-defined concentration. Alternatively, the element may be subjected to sputtering wherein the target of the element is sputtered by irradiation of a high energy stream. Still alternatively, like preparation of ordinary alloys, lithium and the element of group Va may be melted and alloyed.

As set out hereinbefore, by the presence of the element in the lithium matrix, there are formed, as exposed, a multitude of boundary grains, defects and/or ultrafine flexed sites or portions on or in the matrix surface which are considered to act as points or sites for formation of crystal nuclei.

When a lithium secondary cell using such a negative electrode as set out hereinabove is charged, lithium ions are moved from the positive electrode toward the negative electrode. The moving lithium ions are preferentially deposited at the exposed boundary grains, defects and/or ultrafine flexed portions thereby forming a multitude of lithium crystal nuclei thereat. Since the element having a greater electronegativity is present at the boundary grains, defects and/or ultrafine flexed portions, the lithium ions are more likely to move toward the sites of the element which are dispersed throughout the surface matrix portion. Accordingly, the lithium ions are not crystallized as concentrated at one portion or site of the matrix portion, thereby preventing formation of dendrite.

When the lithium ions are continuedly crystallized on the matrix surface, adjacent lithium crystals contact with one another and grow together to form a lithium layer on the matrix surface. The surface of the lithium layer serves as a crystal growth plane. If charging is continued, fresh lithium ions are further crystallized on the lithium layer to merely increase the thickness of the lithium layer. This is why there is suppressed a phenomenon where crystals are locally grown as protruded on the matrix surface, like dendrite crystals.

The negative electrode of the invention can suppressed dendrite crystals from growing during the charge and discharge cycles when applied as a lithium secondary cell. The cell has a prolonged charge and discharge life and ensures quick charge.

It will be noted that the negative electrode and the cell of the invention may take any form such as a button, a disk or the like.

The invention is more particularly described by way of example.

EXAMPLE 1

A 400 μm thick pure metallic lithium foil in the form of a disk having a diameter of 15 mm was provided and phosphorus was implanted on one surface thereof by means of an ion implanting device to obtain negative electrodes for lithium secondary cell. To check the concentration of the implanted phosphorus atoms, five negative electrodes having different amounts of doping per unit area were made as having a phosphorus concentration of zero (No. 1), $1\times10^{15}$ atoms/cm$^2$ (No. 2), $5\times10^{15}$ atoms/cm$^2$ (No. 3), $1\times10^{16}$ atoms/cm$^2$ (No. 4), and $1\times10^{17}$ atoms/cm$^2$ (No. 5). The doping conditions and the phosphorus concentrations in the surface of these negative electrodes are summarized in the following table. In the table, the results of a charge and discharge test of lithium secondary cells using the five negative electrodes, respectively, are also shown as to whether or not dendrite crystals of lithium are formed on the negative electrode surface.

TABLE

| Negative Electrode No. | 1 | 2 | 3 | 4 | 5 |
|---|---|---|---|---|---|
| Implanted Element | nil | phosphorus | phosphorus | phosphorus | phosphorus |
| Amount of Implanted element | — | $1\times10^{15}$ cm$^{-2}$ | $5\times10^{15}$ cm$^{-2}$ | $1\times10^{16}$ cm$^{-2}$ | $1\times10^{17}$ cm$^{-2}$ |
| Acceleration Voltage | — | 350 KeV | 350 KeV | 350 KeV | 350 KeV |
| Phosphorus Concentration in the surface portion of negative electrode | 0 | $5\times10^{17}$ atoms/cm$^3$ | $1\times10^{18}$ atoms/cm$^3$ | $5\times10^{18}$ atoms/cm$^3$ | $5\times10^{19}$ atoms/cm$^3$ |
| Crystals Formed or surface state | dendrite formed substantially | smooth surface | smooth surface | dendrite formed slightly | dendrite formed fairly |

The five negative electrodes were used to assemble button-shaped lithium secondary cells with a diameter of 15 mm along with a positive electrode made of LiMn$_2$O$_4$ and a polyolefin porous film separator impregnated with 1 mole/liter of LiClO$_4$. These cells were each subjected to a charge and discharge test. The crystal form deposited on the respective negative electrode surfaces was determined as follows: each cell was charged under conditions of a current density of 1.0 mA/cm$^2$ and a charging time of 80 minutes; and the resultant lithium crystals were visually observed.

As will be apparent from the results of the above table, dendrite crystals were observed for the cells using the negative electrode Nos. 1 and 5 although the negative electrode No. 5 was usable. Dendrite crystals were partly on the surface of the negative electrode No. 4. With the negative electrode Nos. 2 and 3, the negative electrode surface was smooth without observation of any dendrite crystals. Thus, it will be apparent that when the concentration of phosphorus is less than $5\times10^{19}$ atoms/cm$^3$, preferably less than $5\times10^{18}$ atoms/cm$^3$, more preferably not larger than $1\times10^{18}$ atoms/cm$^3$, the deposition of dendrite crystals is suppressed.

EXAMPLE 2

The general procedure of Example 1 was repeated except that As and Sb were, respectively, used in place of P to make negative electrodes corresponding to electrode Nos. 2 to 4. These electrodes were each subjected to determination of the crystal form, with similar results as shown in the table.

What is claimed is:

1. A negative electrode for lithium secondary cells comprising:

a substrate, at least a surface portion of said substrate comprising a metallic lithium matrix, and an element dispersed and doped in said metallic lithium matrix, said element having an electronegativity greater than that of metallic lithium, said concentration of said element within said lithium matrix being between $5 \times 10^{19}$ atoms/cm$^3$ and $5 \times 10^{15}$ atoms/cm$^3$, said element serving as a site for formation of multiple crystal metallic lithium nuclei when a lithium secondary cell using said negative electrode is charged, whereby metallic lithium crystals are deposited on an entire surface of said metallic lithium matrix through said site to form a metallic lithium layer.

2. A negative electrode according to claim 1, wherein said substrate consists essentially of metallic lithium.

3. A negative electrode according to claim 1, wherein said substrate is made of a conductive material having a metallic lithium matrix layer on one surface thereof.

4. A negative electrode according to claim 1, wherein said element consists of an element of group Va of the periodic table.

5. A negative electrode according to claim 4, wherein the second-mentioned element is a member selected from the group consisting of P, As, Sb and mixtures thereof.

6. A negative electrode according to claim 5, wherein said element consists of P.

7. A negative electrode according to claim 1, wherein said element is present at a concentration less than $5 \times 10^{18}$ atoms/cm$^3$.

8. A negative electrode according to claim 7, wherein the concentration is not larger than $1 \times 10^{18}$ atoms/cm$^3$.

9. A lithium secondary cell having an electrode unit comprising:

a positive electrode;

a negative electrode; and a separator provided between said positive and negative electrodes which is impregnated with a liquid electrolyte including a lithium-containing solute, said negative electrode comprising:

a substrate including a metallic lithium matrix within at least a surface portion thereof, and an element dispersed and doped in said metallic lithium matrix and having an electronegativity greater than that of metallic lithium, said concentration of said element within said lithium matrix being between $5 \times 10^{19}$ atoms/cm$^3$ and $5 \times 10^{15}$ atoms/cm$^3$, said element serving as a site for formation of a multiple crystal metallic lithium nuclei when a lithium secondary cell using said negative electrode is charged, whereby metallic lithium crystals are deposited on an entire surface of said metallic lithium matrix through said site to form a metallic lithium layer.

10. A lithium secondary cell according to claim 9, wherein said substrate consists essentially of metallic lithium.

11. A lithium secondary cell according to claim 9, wherein said substrate is made of a conductive material having a metallic matrix layer on one surface thereof.

12. A lithium secondary cell according to claim 9, wherein said element consists of an element of group Va of the periodic table.

13. A lithium secondary cell according to claim 12, wherein the second-mentioned element is a member selected from the group consisting of P, As, Sb and mixtures thereof.

14. A lithium secondary cell according to claim 13, wherein said element consists of P.

15. A negative electrode according to claim 9, wherein said element is present at a concentration less than $5 \times 10^{18}$ atoms/cm$^3$.

16. A negative electrode according to claim 15, wherein the concentration is not larger than $1 \times 10^{18}$ atoms/cm$^3$.

17. A negative electrode according to claim 1, wherein said element is ionized according to an ion implantation method and implanted into said surface of said metallic lithium matrix.

18. A lithium secondary cell according to claim 9, wherein said element is ionized according to an ion implantation method and implanted into said surface of said metallic lithium matrix.

* * * * *

UNITED STATES PATENT AND TRADEMARK OFFICE
CERTIFICATE OF CORRECTION

PATENT NO.    : 5,498,764

DATED         : Mar. 12, 1996

INVENTOR(S)   : HASEGAWA et al.

It is certified that error appears in the above-identified patent and that said Letters Patent is hereby corrected as shown below:

On the title page, item [73], please change "Karita, Japan" to --Kariya, Japan--.

Signed and Sealed this

Third Day of September, 1996

Attest:

BRUCE LEHMAN

Attesting Officer

Commissioner of Patents and Trademarks